United States Patent [19]

Satomi et al.

[11] Patent Number: 5,392,967
[45] Date of Patent: Feb. 28, 1995

[54] PLUG DEVICE FOR SEALING LIQUID CONTAINER

[75] Inventors: Yasuhiko Satomi; Seiichi Itoh; Isao Watanabe; Toru Goto; Shoji Sekihara, all of Tokyo, Japan

[73] Assignee: Nippon Sanso Corporation, Tokyo, Japan

[21] Appl. No.: 108,979

[22] Filed: Aug. 18, 1993

[30] Foreign Application Priority Data

Aug. 31, 1992 [JP] Japan ............................. 4-061300[U]
Nov. 10, 1992 [JP] Japan ............................. 4-077371[U]

[51] Int. Cl.⁶ ............................................. B65D 51/00
[52] U.S. Cl. ..................... 222/509; 222/518; 222/545; 222/559; 222/563; 215/311; 215/315; 251/323
[58] Field of Search ............... 222/509, 518, 545, 559, 222/563, 568, 571; 215/311, 315; 220/256, 361; 251/321-323

[56] References Cited

U.S. PATENT DOCUMENTS

| 2,735,566 | 2/1956 | Bramming | 222/545 |
| 2,946,491 | 7/1960 | Bramming | 222/545 |
| 4,658,973 | 4/1987 | Zimmermann | 222/552 |
| 4,671,436 | 6/1987 | Hagan | 222/518 X |
| 4,960,218 | 10/1990 | Toida et al. | |
| 5,037,015 | 8/1991 | Collins | 222/509 X |

FOREIGN PATENT DOCUMENTS 0156963 10/1985 European Pat. Off. .
0163535 12/1985 European Pat. Off. .
0423365 4/1991 European Pat. Off. .
936212 9/1963 United Kingdom ................ 222/559

Primary Examiner—Andres Kashnikow
Assistant Examiner—Anthoula Pomrening
Attorney, Agent, or Firm—Hoffmann & Baron

[57] ABSTRACT

A plug device for a liquid container is presented to enable cleaning of a flow passage of the liquid container as well as to eliminate the liquid being left in the flow passage during the operation of the liquid container, thus providing hygienic and safe operation of the container. The plug device consists of an outer plug member and an inner plug member which is detachably attached to the outer plug member. When the members are assembled, a flow passage is formed automatically to enable access to the liquid stored in the container. When a press button provided on the inner plug member is pressed down, the opening disposed at the bottom of a plunger device remains open, resulting in the interior space of the container being connected with the flow passage via the internal liquid passage. In this condition, the container can be tilted to dispense the liquid from the container. When the dispensation is completed, and the container is uprighted, the liquid in the flow passage is returned to the interior space of the container via a tapered surface formed on the inner plug member, thus leaving no liquid in the flow path. The plunger device is operated again to close off the opening, and thereby offering safe operation and enabling to maintain the quality of the liquid stored in the container, by removing a potential source of contamination from the residual liquid.

2 Claims, 5 Drawing Sheets

PLUG DEVICE FOR SEALING LIQUID CONTAINER

BACKGROUND OF THE INVENTION

1. Field of the Invention

The present invention relates to a plug device for sealing a container for a liquid material, such as a thermos bottle. The plug device not only seals the opening but also facilitates dispensing of the liquid from the container.

2. Background Technology

Conventionally, a plug for a liquid container, such as a thermos bottle disclosed in a Japanese Utility Model Application, Second Publication S57 (1982)-38119 has been known. The plug body comprises an outer plug member and an inner plug member which is screwed into the outer plug member, and a ring-shaped liquid path formed between the inner plug member and the outer plug member.

In such a plug body, when the inner plug member is screwed into the outer plug member, a packing provided in the inner plug member closes the ring-shaped liquid path, and when the inner plug member is loosened, the liquid path is opened.

In the plug body of such a construction, because the closing/opening of the liquid path is performed by turning of the inner plug member against the outer plug member, closing/opening operation of the container is cumbersome. Therefore, a push-button operated plug body developed earlier by the inventors of the present invention as disclosed in a Japanese Utility Model Application, First Publication, S63(1988)-103629, has become more widely utilized.

Although the push-button type plug body disclosed in the above mentioned application is more convenient than other types, because the liquid path is disposed inside the plug body, it creates an impression of being non-hygienic since the liquid path could not be totally cleaned. Also, there was a problem that the drops of the previously dispensed liquid remained in the path. When the liquid drops are left behind, the liquid remains are exposed to the atmosphere, and could contribute to uncleanliness and quality deterioration. If the liquid residue happens to be hot, hot liquid could run out if the container was upset.

SUMMARY OF THE INVENTION

The present invention was made in view of the state of the art as described above, and an object of the present invention is to present a plug device having a plug body which facilitates dispensing of a liquid contained in a container in a hygienic and safe manner.

The plug device having a plug body comprises an outer plug member and an inner plug member, where the inner plug member comprises: a plurality of internal liquid passages of a ring-shape which communicate with the interior space of the container body; a valve member for opening or closing the opening section of the internal liquid passages; and a plunger device, operated by a press button means, for moving the valve member so as to open or close the opening section; and where outer surface of the ring-shaped outer wall section of the inner plug member is detachably mated with the inside surface of the outer plug member, thereby forming a space defined by the outside peripheral surface of the inner plug member and the inside peripheral surface of the outer plug member so as to serve as a flow passage for the liquid and communicate the internal liquid passages of the inner plug member with the exterior environment, thereby dispensing the liquid contained in the container body.

In the plug body of the above configuration, the threading attachment is presented as an example of a detachable method, in which the female threads formed on the outer plug member are detachably engaged with the male threads formed on the inner plug member, and by so doing, a flow passage for the liquid contained in the container is automatically formed which communicates the internal liquid passage with the flow passage.

When a press button is pressed down in this condition, the valve member can be moved towards or away from the opening section of the internal liquid passage. If the valve member is moved towards the opening section, the valve member closes the opening, thereby sealing the liquid in the container. If the valve member moves away from the opening section, the valve member opens the opening, thereby permitting The liquid to be dispensed.

The construction of the plug body of the present invention is advantageous because a simple joining operation, exemplified by detachable threading attachment, of the inner and outer plug members enables to form a unitized body, and because, in so doing, the flow passage is formed automatically.

The operation of the plug device is facilitated because the fluid can be dispensed simply by pressing the press button thereby moving the valve member so as to open or close the opening of the inner plug member.

The cleaning of the flow passage is facilitated because the simple threading attachment of the outer and inner plug members enables easy separating of the inner and outer plug members for thorough cleaning, thereby maintaining hygienic condition of the plug body.

Further advantageous aspect of the present invention is the provision of a tapered shape for the upper surface at the top region of the inner plug member which slopes towards the interior space of the container. After dispensing the liquid by tilting the container, the container is uprighted thereby returning the residual liquid to the interior space of the container along the tapered sloping upper surface of the inner plug member. Therefore, there is no danger of any hot liquid remaining in the plug body, or potential contamination of the original liquid stored in the plug body.

The plug device of the present invention therefore enables hygienic and safe condition of a liquid container to be maintained throughout its service life.

DETAILED DESCRIPTION OF THE PREFERRED EMBODIMENT

The preferred embodiment will be explained with reference to the drawings.

Figure 1:
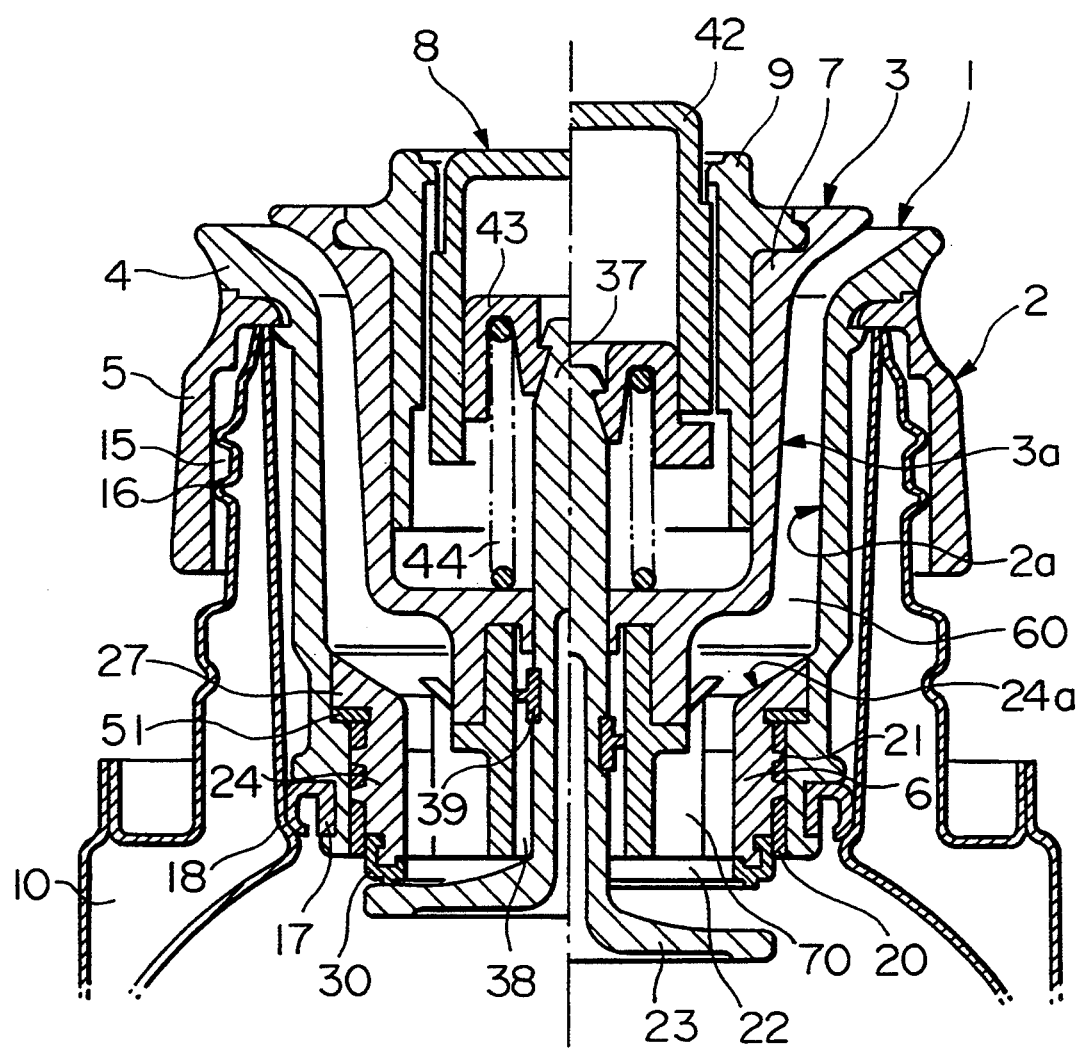
FIG. 1 is a cross sectional view of an embodiment of the plug body of the present invention for a container body.

In FIG. 1, the numeral 1 represents a plug body and comprises an outer plug member 2 of an approximately cylindrical shape which is inserted into the mouth section of the container body 10; and an inner plug member 3 of a rod shape which is joined with the inside section of the outer plug member 2. Between the inside surface 2a of the outer plug member 2 and the outside surface 3a of the inner plug member 3, there is formed a flow passage 60 to communicate with internal liquid passages 70 accessing the inner section of the container, with the outside environment. A valve member 23 is provided in the bottom end section of the inner plug member 3, which operates up and down to close or open the internal liquid passages 70.

Figure 2:
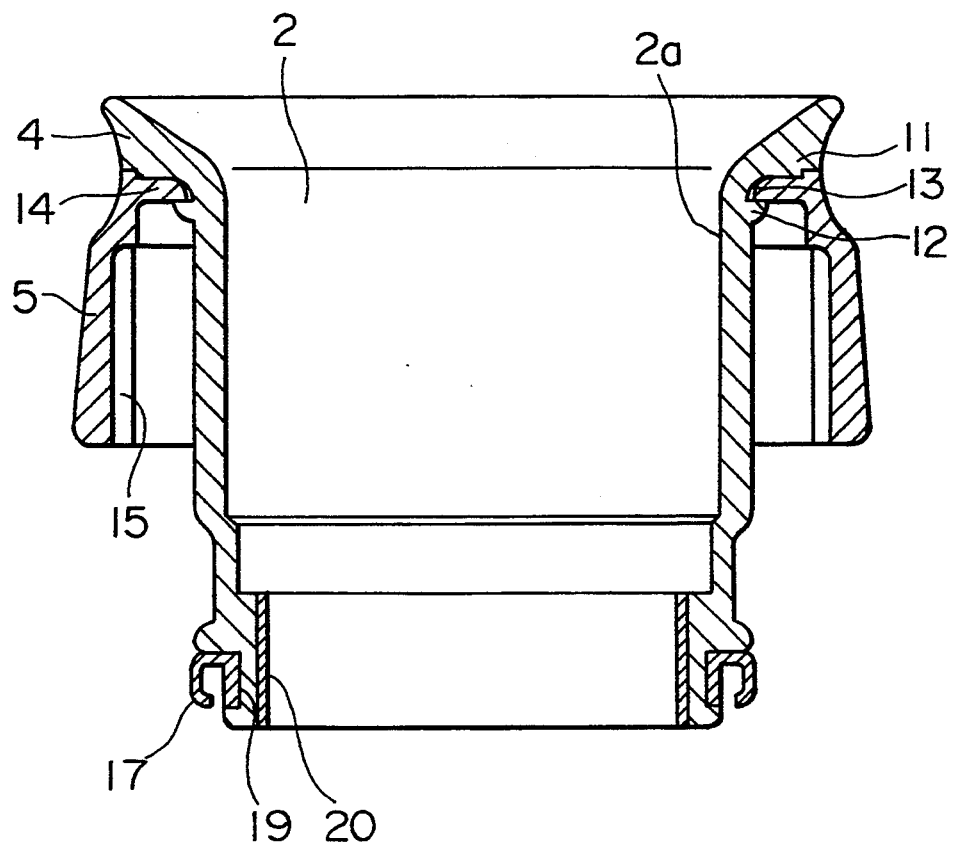
FIG. 2 is a cross sectional view of the outer plug member.

The outer plug member 2, shown in FIG. 2, comprises an inner cylinder 4 having an outer diameter which is slightly smaller than the inner diameter of the mouth section of the container body 10 and an outer cylinder 5 formed so as to surround the upper half section of the inner cylinder 4 whose upper region flares outwardly towards the top forming a tapered section. On the external periphery of the tapered section, a lip part 11 is formed around its circumference, and a ridge part 12 formed on the lower section of the tapered section around its circumference. As shown in FIG. 2, the bottom surface of the lip part 11, the top surface of the ridge part 12 and the outside surface of the inner cylinder 4 constitute a lip groove 13.

A packing groove 19 is formed around the outside periphery of the bottom region of the inner cylinder 4, and a hollow ring-shaped seal packing 17 is installed in the packing groove 19 as shown in FIG. 2. A second female thread section 20 is formed on the bottom inside surface of the inner cylinder 4 for threading attachment with a second male thread section 21 of the inner plug member 3.

A first protruding part 14 is formed in the circumferential direction on the inside peripheral surface of the outer cylinder 5 at its top end section. The inner cylinder 4 and the outer cylinder 5 are unitized to form the outer plug member 2, by engaging the first protruding part 14 with the lip groove 13 of the inner cylinder 4. The thickness and the height dimensions of the first protruding part 14 are slightly smaller than the inside width and depth dimensions of the lip groove 13 so as to permit turning movement of the inner cylinder 4 with respect to the outer cylinder 5. The inside peripheral surface of the outer cylinder 5 is provided with a first female thread section 15 which engages with a first male thread section 16 provided on the outer peripheral surface at the top region of the container body 10 so as to firmly attach plug body 1 to the container body 10.

Figure 3:
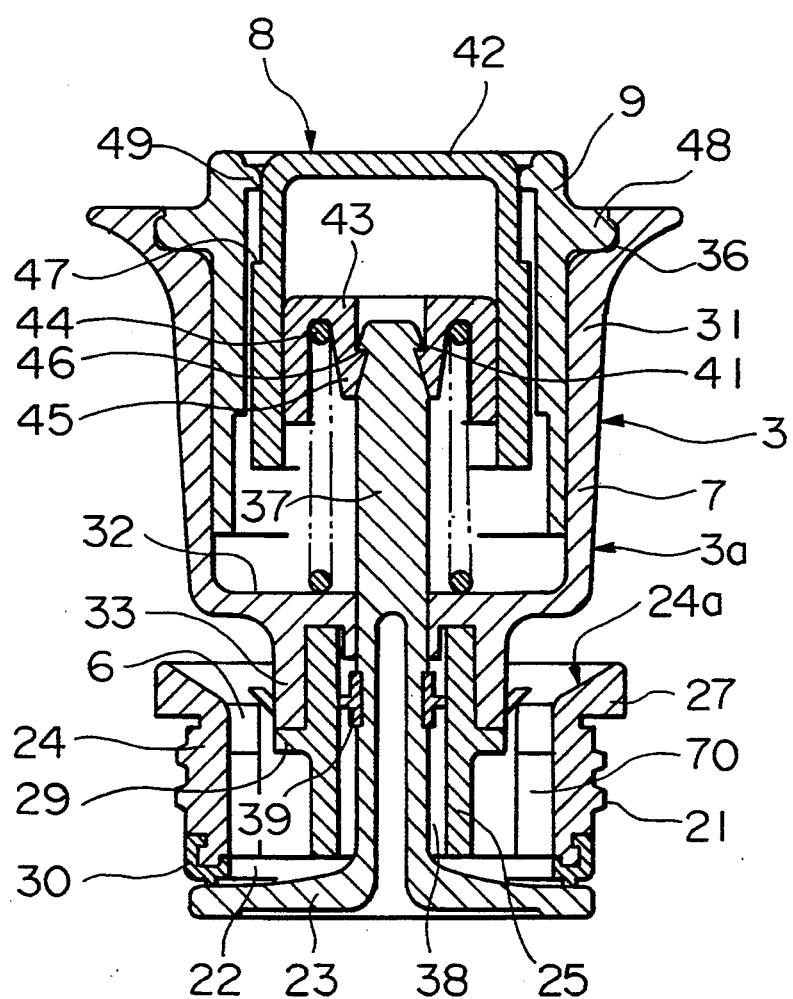
FIG. 3 is a cross sectional view of the inner plug member.
Figure 4A:
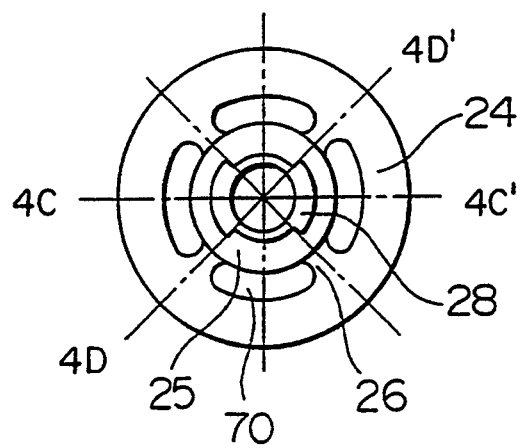
FIGS. 4 A–D present (a) a top view, (b) a side view and (c), (d) cross sectional views of the bottom region of the inner plug member.
Figure 4B:
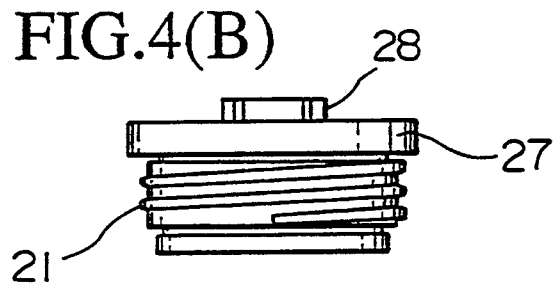
Figure 4C:
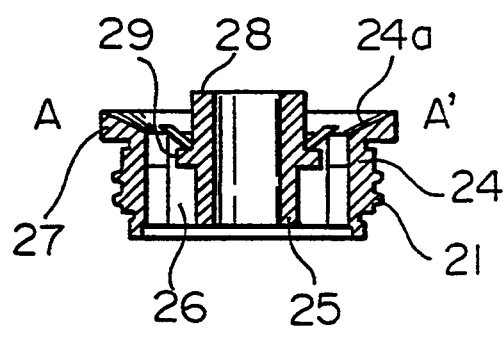
Figure 4D:
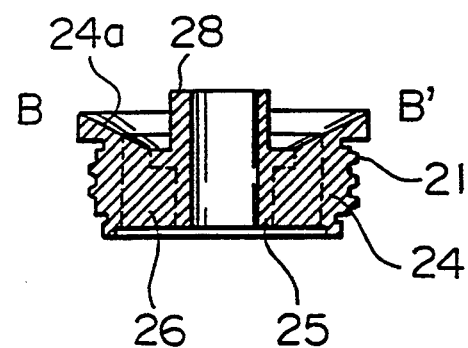
Figure 5A:
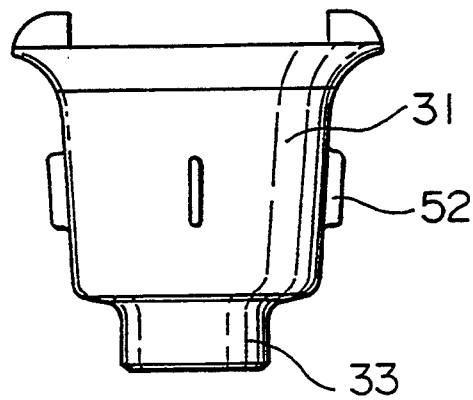
FIGS. 5 A–D present (a) a side view, (b) a top view and (c), (d) cross sectional views of the top region of the inner plug member.
Figure 5B:
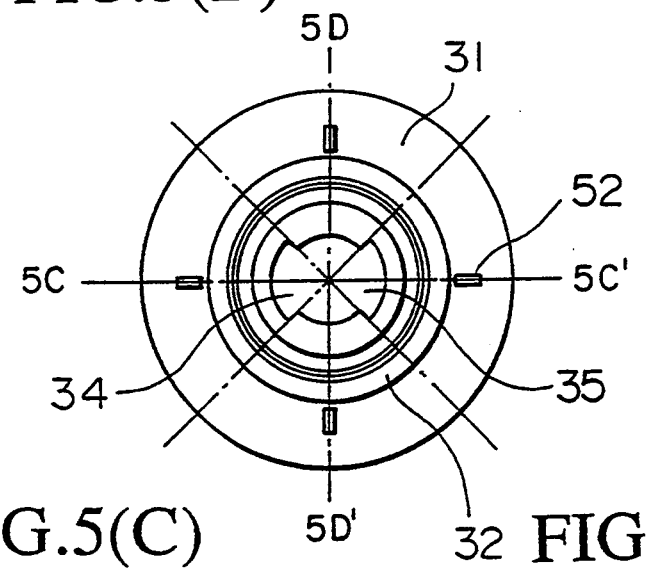
Figure 5C:
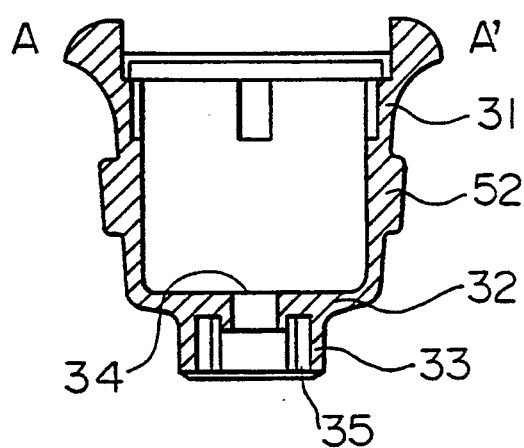
Figure 5D:
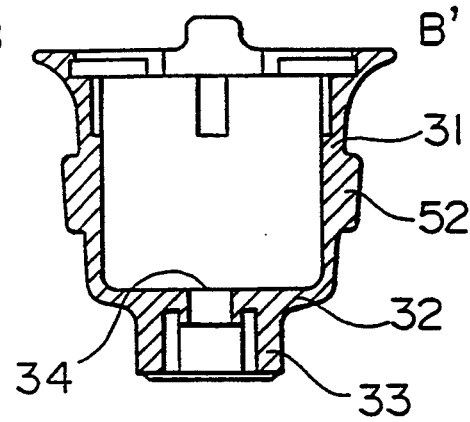

The inner plug member 3, shown in FIG. 3, comprises: an inner plug bottom section 6 of a double cylinder construction having open top and bottom ends; an inner plug top section 7 of a cup shape for joining to the upper part of the inner plug bottom section 6; a valve member 23 which closes or opens the opening section 22 disposed at the bottom region of the inner plug bottom section 6; plunger device 8 disposed inside the inner plug top section 7 to move the valve member 23; and a lid member 9 for retaining the plunger device 8 inside the inner plug top section 7.

Referring to FIG. 4, the inner plug bottom section 6 comprises: two cylindrical wall sections 24, 25 consisting essentially of an outside wall section 24 of a cylindrical shape whose inside diameter is about the same as the inside diameter of the bottom region of the outer plug member 2; and an inside wall section 25 whose outside diameter is smaller than the inside diameter of the outside wall section 24; and a joint section 26 which joins the two cylindrical wall sections 24, 25. The outside wall section 24 and the inside wall section 25 are disposed coaxially, and the radially extending joint section 26 joins the two sections 24, 25 at right angles, as illustrated in FIG. 4 (a). In the inner plug bottom section 6, there are four vertical through spaces defined by the intersecting surfaces of the outside surface of the inside wall section 25, the inside surface of the outside wall section 24 and the side surfaces of the joint section 26. These ring-shaped spaces constitute the internal liquid passages 70.

Further, the outside periphery of the outside wall section 24 is provided with the second male thread section 21 to engage with the second female thread section 20 of the outer plug member 2, and a flange member 27 at its top end. Also, it is preferable to form tapered surfaces sloping towards the internal liquid passages 70 on the upper surface 24a of the outside wall section 24. There is a line packing 30 having a ridge protruding towards the bottom at the bottom end of the outside wall section 24 to provide positive sealing against the valve member 23 to be described later.

The configuration of the inner plug top section 7 will be explained in more detail below.

The inner plug top section 7, shown in FIGS. 3 and 5, comprises a wall section 31 of a cylindrical shape and a bottom section 32 which closes the bottom region of the wall section 31, and has a skirt section 33 formed on the bottom surface thereof. In the center of the bottom section 32, there is a hole 34 which communicates with the interior space of the skirt section 33, thereby enabling the inner plug top section 7 to provide a communication between the inner spaces of the skirt section 33 and wall section 31.

Also, the top end of the wall section 31 of the inner plug top section 7 is flared out to form a tapered surface of upwardly increasing diameter, and a lid groove 36 extending in the circumferential direction.

As shown in FIGS. 4 and 5, a second protruding part 29 is formed around the circumference of the inside wall section 25 near its center region. The top surface of the second protruding part 29 contacts the bottom surface of a cylindrical shaped skirt section 33 of the inner plug top section 7, and the contact interface is fused to unitize the two inner section 6 and 7. Further, a stud member 28 is provided on the inside wall section 25. The stud member 28 engages with a channel part 35 formed on the skirt section 33 of the inner plug top section 6, and serves to prevent the relative rotation of the inner plug bottom section 6 with respect to the inner top section 7.

Also, as shown in FIG. 5 (c) and (d), four orthogonally disposed protruding parts 52 are formed on the circumferential periphery of the inner plug top section 7. The thickness of the protruding parts 52 is slightly smaller than the separation width of the flow passage 60 formed between the outside surface 3a of the inner plug section 3 and the inside surface 2a of the outer plug member 2.

The valve member 23, shown in FIG. 3, is a circular-shaped member having the same outside diameter as that of the inner plug bottom section 6, and is formed integrally with a stem member 37 which extends vertically from the center of the valve member 23, as illustrated in the figure. The stem member 37 passes through the stem hole 38, defined by the inside wall section 25 of the inner plug bottom section 6, the skirt section 33 of the inner plug top section 7 and a hole 34 of the bottom section 32, to reach the interior space of the inner plug top section 7. A stem packing 39 is provided for the stem member 37 to ensure liquid tightness of the interior space of the container.

The top end of the stem member 37 is formed into a tapered-shape which becomes narrower toward its top, and a notched part 41 is formed near the top end.

The plunger device 8 comprises, as shown in FIG. 3: a press button 42 of a cup-shape; a rotation member 43 freely rotatably disposed in the press button 42; a spring member 44 disposed between the rotation member 43 and the bottom section 32 of the inner plug top section 7; and the engaging section (not shown) which engages with the rotation member 43.

The rotation member 43 is shaped in a form of a cup having a hole in the center, and is disposed so that its outside peripheral surface is in contact with the inside peripheral surface of the press button 42, and the contact interface is provided with a device to move the rotation member 43 vertically as well as to rotate the member 43 in the circumferential direction, when the press button 42 is pressed down. Although not shown in the figures, there is also a provision to engage or disengage, depending on the position of the rotation member 43, a latching piece disposed on the outside peripheral surface of the rotation member 43 with a latching piece disposed on the side surface of the press button. When the latching pieces engage, the rotation member 43 moves down with the press button 42, but when the latching pieces disengage, the rotation member 43 stays down.

The spring member 44, disposed between the rotation member 43 and the inner plug top section 7, operates to return the rotation member 43 back to its initial position when the rotation member 43 is moved downward.

Further, the hole formed in the center of the rotation member 43 is provided with a stem engaging part 45 extending downward, as shown in FIG. 3, whose inside surface is provided with a hook part 46. The stem engaging part 45 engages with the top section of the stem member 37 of the valve member 23 by the hook part 46 making contact with the notched part 41, thereby enabling the rotation member 43 to rotate relative to the stem member 37.

Also, disposed on the side surface of the press button 42, is a step part 47, shown in FIG. 3, formed between a small diameter upper section and a larger diameter lower section of the press button 42.

The lid member 9 of the inner plug top section 7 is a cylindrical-shaped member having a lip part 48 extending in the circumferential direction formed at the top region thereof. The lip part 48 is engaged with and fixed in the lid groove 36 formed in the upper inside surface of the inner plug top section 7. The upper limit of the travel of the press button 42 is limited by the top surface of the step part 47 coming into contact with the third protruding part 49 formed on the inside surface of the lid member 9. Therefore, even with the upward biasing force of the spring member 44, the plunger device 8 does not come out of the inner plug top section 7, thereby assuring that the plunger device 8 is settled in the inner plug top section 7.

The inner plug member 3 and the outer plug member 2 of the above described configuration are assembled as a unit plug body 1 by engaging the second male thread section 21 formed on the bottom end of the inner plug member 3 with the second female thread section 20 formed on the inside surface of the bottom end of the outer plug member 2. In this case, the correct fitting of the two members 2, 3 is assured by the guiding presence of the protruding parts 52 governing the spacing between the members 2, 3, thereby assuring that the inner plug member 3 cannot be threaded wrongly into the outer plug member 2.

Further, a flat packing 51 is provided between the bottom surface of the flange member 27 of the inner plug bottom section 6 and the top surface of the second female thread section 20 at the bottom region of the outer plug member 2 to assure the liquid tightness of the container interior space and the flow passage 60.

Next, the method of using the plug body 1 will be explained.

Suppose that the inner plug member 3 is in a condition so that the rotation member 43 of the plunger device 8 is free to move, and that the step part 47 of the press button 42 is pressed against the third protruding part 49 of the lid member 9 by the spring member 44. In this condition, the stem member 37 hooked with the rotation member 43, i.e. the valve member 23 itself, is also moved upward, and the top surface of the valve member 23 touches the line packing 30 provided at the bottom of the opening section 22, thereby sealing the internal liquid passages 70.

After pouring a certain amount of liquid in the container body 10, the plug body 1 is inserted into the mouth section of the container body 10. Then, the outer cylinder 5 of the outer plug member 2 is rotated to engage the first female thread section 15 formed on the inside surface of the outer cylinder 5 with the first male thread section 16 formed on the outside periphery of the container body 10, thereby fixing the plug body 1 on the container body 10. In this case, since the outer cylinder 5 is freely slidable with respect to the plug body 1, the plug body 1 itself need not be rotated, but only the outer cylinder 5 can be rotated to firmly attach the plug body 1 to the container body 10. This is advantageous because, in some cases, the handling of the container body may be difficult. Also, in this condition of assembly, the seal packing 17 is pressed against the curved section 18 of the container body 10 to provide liquid tightness between the interior space of the container and the outside environment. Therefore, even if the container body 10 is tipped, there is no danger of the liquid leaking out.

Next, by pressing down on the press button 42, the rotation member 43 is moved downward against the upward biasing force exerted by the spring member 44, and the latching piece (not shown) provided on the outside periphery of the rotation member 43 becomes engaged with the latching piece (not shown) provided on the bottom region of the press button 42, thus retaining the rotation member 43 in the down position. With the downward movement of the rotation member 43, the stem member 37 is also moved down, thus separating the valve member 23 disposed on the bottom end of the stem member 37 from the bottom surface of the opening section 22 for the internal liquid passages 70, thereby opening the opening section 22.

If the container body 10 is now tilted in the condition described above, the content of the container body 10 flows from the opening section 22 into the internal liquid passages 70, and then into the flow passage 60 which communicates with the internal liquid passages 70, and the liquid flows out via the upper region of the ring-shaped mouth space of the flow passage 60.

When the pouring operation is completed and the container body 10 is uprighted, because the upper surface 24a of the outside wall section 24 of the inner plug bottom section 6 is sloped downward towards the internal liquid passages 70, the liquid naturally flows back to the interior space of the container body 10 via the internal liquid passages 70. Therefore, there is no residual liquid remaining in the liquid passage.

Further, when the press button 42 is pressed down once again, the rotation member 43 is rotated once again, the latching action is nullified. Then, the rotation body 43 is returned upward by the counter force of the spring member 44, and with the upward move of the rotation member 43, the stem member 37 also moves upward. The valve member 23 disposed at the bottom region of the stem member 37 contacts the end surface of the opening section 22 of the internal liquid passages 70, thereby closing the opening section 22 once again.

According to the configuration of the plug body 1 presented above, because the outer plug member 2 and the inner plug member 3 are made detachable by disconnecting the second female thread section 20 of the outer plug member 2 from the second male thread section 21 of the inner plug member 3, the flow passage 60 can be accessed through the inside surface 2a of the outer plug member 2 and the outside surface 3a of the inner plug member 3, and they can be easily cleaned, so as to maintain the flow passage 60 in a hygienic condition.

Further, the upper surface 24a of the outside wall section 24 of the inner plug bottom section 6 is sloped down towards the ring-shaped internal liquid passages 70, no liquid remains in the liquid passage, thus preserving the quality of the liquid and providing superior safe operation.

An important feature of the plug body of the present invention is that the outer plug member and the inner plug member are easily detachable. To achieve such a feature, the configuration and the shape of the plug body need not limited to those in the embodiment. For example, the construction of the plunger device 8 comprising a stem member 37 to open and close the valve member 23 against the opening section 22 in the ring-shaped internal liquid passages 70 is not limited to the spring-loaded device presented above. It can easily be replaced with other equivalent device.

Also, the connecting means used in the embodiment to join the outer plug member 2 with inner plug member 3 is also not limited to threaded connection presented above. It can easily be replaced with other connecting method of a suitable liquid-tight construction.

What is claimed is:

1. A plug device for providing a liquid-tight sealing for a container body comprising an outer plug member and an inner plug member, wherein said inner plug member comprises an inner plug top section and an inner plug bottom section, said inner plug bottom section having a plurality of internal liquid passages arranged in a ring-shape which communicate with an interior space of said container body, wherein a valve member for opening and closing an opening section of the internal liquid passages and a plunger device, operated by a press button means, for moving said valve member so as to open and close said opening section are equipped in the inner plug member, and wherein an outer surface of the inner plug bottom section is detachably mated with a bottom inside surface of the outer plug member and a space being defined by an outside peripheral surface of the inner plug top section and a top inside peripheral surface of the outer plug member, the space serving as a flow passage for the liquid and providing communication of the internal liquid passages of said inner plug bottom section with the exterior environment thereby dispensing the liquid contained in said container body.

2. A plug device as claimed in claim 1, wherein a tapered surface sloping towards an interior of the internal liquid passages are formed on an upper surface region of said outer surface of the inner plug bottom section.

* * * * *